(12) United States Patent
Madden et al.

(10) Patent No.: US 6,996,706 B1
(45) Date of Patent: Feb. 7, 2006

(54) BOOTING AN OPERATING SYSTEM OR RUNNING OTHER PRE-BOOT CODE FROM A FILE STORED UNDER A DIFFERENT OPERATING SYSTEM

(75) Inventors: Paul E. Madden, Orem, UT (US); Jonathan R. Ludwig, Lehi, UT (US); Derrick S. Shadel, South Jordan, UT (US); Val A. Arbon, Orem, UT (US)

(73) Assignee: Powerquest Corporation, Orem, UT (US)

( * ) Notice: Subject to any disclaimer, the term of this patent is extended or adjusted under 35 U.S.C. 154(b) by 676 days.

(21) Appl. No.: 09/788,191

(22) Filed: Feb. 17, 2001

Related U.S. Application Data (60) Provisional application No. 60/183,725, filed on Feb. 19, 2000.

(51) Int. Cl.
G06F 9/24 (2006.01)
(52) U.S. Cl. ................ 713/2; 713/1; 711/113
(58) Field of Classification Search ............... 713/1, 713/2; 711/113; 710/8
See application file for complete search history.

(56) References Cited

U.S. PATENT DOCUMENTS

| | | | |
|---|---|---|---|
| 5,062,042 A | 10/1991 | Binkley et al. | 364/200 |
| 5,142,680 A | 8/1992 | Ottman et al. | 395/700 |
| 5,261,104 A * | 11/1993 | Bertram et al. | 713/1 |
| 5,280,627 A | 1/1994 | Flaherty et al. | 395/700 |
| 5,307,497 A * | 4/1994 | Feigenbaum et al. | 713/1 |
| 5,349,673 A | 9/1994 | Yasuda | 395/800 |
| 5,361,358 A | 11/1994 | Cox et al. | 395/700 |
| 5,404,527 A | 4/1995 | Irwin et al. | 395/700 |
| 5,418,918 A | 5/1995 | Vander Kamp et al. | 395/375 |
| 5,452,454 A | 9/1995 | Basu | 395/700 |
| 5,546,585 A | 8/1996 | Soga | 395/700 |
| 5,724,550 A * | 3/1998 | Stevens | 711/146 |
| 5,764,593 A | 6/1998 | Turpin et al. | 395/652 |
| 5,956,745 A | 9/1999 | Bradford et al. | 711/137 |
| 6,101,601 A * | 8/2000 | Matthews et al. | 713/2 |
| 6,282,641 B1 * | 8/2001 | Christensen | 713/2 |

(Continued)

FOREIGN PATENT DOCUMENTS

JP 08179937 A * 7/1996

(Continued)

OTHER PUBLICATIONS

Mary, Re: removing an nt server installation from an nt workstation pc, Sep. 23, 1999.*

(Continued)

*Primary Examiner*—Thomas Lee
*Assistant Examiner*—Mark Connolly
(74) *Attorney, Agent, or Firm*—Workman Nydegger (57) ABSTRACT

The invention provides tools and techniques for running pre-boot code on a computer from a file stored in a file system on the computer. The pre-boot code may include an operating system which is not otherwise installed on the system. For instance, the pre-boot code may be used to boot a DOS operating system on a computer which lacks a DOS hard disk partition. The pre-boot code may contain code to perform operations that are difficult to perform after the operating system is booted, such as code for monitoring the boot process to help debug it. The pre-boot code is obtained from the file without using booted file system code, and is then executed. The code may be obtained by redirecting floppy drive I/O to read the pre-boot code from a copy in memory, or to read it as needed from one or more files on the hard disk.

18 Claims, 2 Drawing Sheets

U.S. PATENT DOCUMENTS

| | | | |
|---|---|---|---|
| 6,308,264 B1 * | 10/2001 | Rickey | 713/2 |
| 6,370,614 B1 * | 4/2002 | Teoman et al. | 711/113 |
| 6,415,382 B1 * | 7/2002 | Kwan | 713/2 |
| 6,487,608 B2 * | 11/2002 | Gifford et al. | 710/8 |
| 6,539,456 B2 * | 3/2003 | Stewart | 711/113 |
| 6,658,563 B1 * | 12/2003 | Ice et al. | 713/2 |
| 6,668,318 B1 * | 12/2003 | Jenkins et al. | 713/1 |

FOREIGN PATENT DOCUMENTS

| | | | |
|---|---|---|---|
| JP | 09081370 A | * | 3/1997 |

OTHER PUBLICATIONS

International Buisness Machines, Split-memory facility for windows NT(tm), May 1999, Research Disclosure Journal.*

A computer floppy disk program/data file system, Aug. 1988, Research Disclosure Journal.*

Stuckelberg et al, Linux Remote-Boot mini-HOWTO:, v3. 19, Feb. 1999.*

Porkka Joe, Boot disk optimizer?, Apr. 12, 1991.*

Smits Ron, The Making of a bootable floppy, Feb. 1, 1994, pp. 1-4.*

Chapman Graham, The Linux Bootdisk HOWTO, Feb. 6, 1995, pp. 1-7.*

Perry Tony, Someone please explain boot.ini as I have lost NT!!!!!, Sep. 29, 1995, pp. 1-3.*

Smallen Brad, booting NT off floppy (bootloader on floppy, NT on scsi id 3), Jul. 31, 1996, pp. 1-3.*

Bigby Bruce, Increased memory and caching . . . ramdisk the answer?, Nov. 19, 1996, pp. 1-3.*

Pete, Ram Disk?, Feb. 17, 1997, pp. 1-5.*

Woodhull Al, DOS-based RAM disk Minix . . . or such a thing?, Mar. 13, 1998, pp. 1-2.*

Opiate, how to make a Dos boot disk using win 95???, May 12, 1999, pp. 1-3.*

Neilsen Mark, How to use a Ramdisk for Linux, Nov. 1, 1999, pp. 1-4.*

Rembo Technology, LoadRamDisk, 2000.*

Nutt Gary J, Operating Systems: A Modern Perspective, 2000, , Addison-Wesley, $2^{nd}$ ed., pp. 293-299.*

CONFIDENTIAL Patent Application 1760.2.13; no later than Apr. 30, 1999.

PCT Published Application WO 00/16193 published Mar. 23, 2000; the specification—but not necessarily the claims themselves—corresponds to U.S. Patent No. 6,178,503 issued Jan. 23, 2001.

Duncan, *Advanced MSDOS*, pp. 10-18; 1986.

Covington et al., *Dictionary of Computer Terms*, $3^{rd}$ Ed., entry for "boot"; 1992.

Silberschatz et al., *Operating System Concepts*, pp. 417-418; 1994.

Preboot Execution Environment (PXE) Specification, Version 2.1, table of contents and pp. 71-101; Sep. 20, 1999.

Dalton et al., *Windows NT Server 4: Security, Troubleshooting, and Optimization*, pp. 121-135; 1996.

CONFIDENTIAL Patent Application 1760.2.24; no later than Mar. 22, 2000.

Buelens et al., "OS Deployment Strategies with Intel® LANDesk® Management Suite and PowerQuest"; Jun. 2001.

* cited by examiner

BOOTING AN OPERATING SYSTEM OR RUNNING OTHER PRE-BOOT CODE FROM A FILE STORED UNDER A DIFFERENT OPERATING SYSTEM

RELATED APPLICATIONS

This application claims priority to commonly owned application Ser. No. 60/183,725 filed Feb. 19, 2000, now abandoned which is incorporated herein by reference.

FIELD OF THE INVENTION

The present invention relates to the process of booting a computer, and relates more particularly to tools and techniques for running code to load an operating system which is not conventionally installed in a partition of that computer and/or to run other pre-boot code that is stored in a user-accessible file.

TECHNICAL BACKGROUND OF THE INVENTION

To assist in understanding the present invention, several definitions are provided below. These definitions are not necessarily exclusive or comprehensive; they are provided instead primarily as aids to study and discussion. In particular, they illustrate distinctions which may help one understand better how aspects of the present invention relate to tools and techniques that were already known in other contexts. The terms to be defined were selected, and the definitions below were written, after the present invention had already been conceived and described. That is, both the terms themselves and the points emphasized in their definitions were selected in hindsight, with the invention and various references already in mind. Thus, one of skill at the time of invention who had not already been told about the invention would not necessarily have focused on any or all of these terms or on the distinctions that are highlighted by the definitions given here.

BOOT CODE: Boot code is used to load and/or start the OPERATING SYSTEM. Boot code is normally stored in system read-only memory (ROM) and in one or more specified SECTORS that are read by the ROM code, such as the first sector of the first bootable disk found on the machine being booted. On a diskless node, BOOT CODE may read an operating system image over a network link. In many IBM-compatible PCs, the system ROM checks for boot code on a floppy drive first, and boots using that code if it is found; if a bootable floppy is not found, then the system looks for a bootable hard disk, and in some cases for a bootable CD-ROM and/or a network link to a boot server. Regardless of whether the operating system image is loaded from a floppy, a hard disk, a CD-ROM, or a network, the BOOT CODE is run before the operating system, and before the FILE SYSTEM code, so the operating system boot code is not typically stored in a FILE.

CONTIGUOUS: Contiguous SECTORS are sectors located next to each other in a single clump, such as the sixty-three sectors identified as logical sector 0 through logical sector 62. Particular contiguous sectors are not necessarily adjacent, e.g., in the example logical sector 0 and logical sector 62 are not adjacent but they are contiguous. However, contiguous sectors of a file are not separated by any sector that does not belong to the file, except perhaps by unusable sectors such as known bad sectors. A PARTITION is a set of contiguous sectors. A set of contiguous sectors in a given FILE in a FILE SYSTEM is sometimes called a "run". A file system defragmenter tries to increase the number of contiguous sectors, so that all sectors of a given file are contiguous. In general, however, the sectors in a given file are not necessarily contiguous, and even if they are, they will not necessarily remain contiguous as changes are made to the file's content and the set of sectors allocated to the file changes. A region of random access memory (RAM) is contiguous if no two addressable memory elements (e.g., bytes or words) of the region are separated by an addressable memory element which is not part of the region.

DIRECTORY: A directory is a place to put FILES in a FILE SYSTEM, from a user's point of view. From the file system point of view, the data in the files of a given directory may be in SECTORS scattered throughout a PARTITION, even though the user views the files as all being located in the same place. Directories are arranged in a hierarchy, so a root directory may contain files and/or other directories; the directories may in turn contain files and/or other directories, and so on.

FILE: A file is a named piece of data; the file's name allows OPERATING SYSTEMS and application programs to use the FILE SYSTEM to retrieve the data without making the operating system or application program otherwise identify the disk SECTORS that currently hold the data. Data can be stored in one or more sectors without being stored in a file, but data accessed through application programs such as word processors and spreadsheets is typically stored in one or more files. Indeed, the code for an application program itself is typically stored in one or more files. A file is defined by and within a file system. Thus, files can be renamed, copied, and/or moved by users. Sectors on a disk which are known to some specialized program, but are not known generally to users collectively by name and to file system software and file system structures, do not constitute a file.

FILE SYSTEM: A file system includes system code and/or data structures which track the current location on disk of data that is stored in zero or more files on disk. A file system may be viewed as a mapping between DIRECTORIES and FILES, on the one hand, and disk SECTORS, on the other hand. A file system resides in one or more PARTITIONS. Examples of file systems include FAT (file allocation table) file systems, NTFS (Windows NT file system), HPFS (High Performance File System), UNIX-style files systems (those using vnode or inode structures, for instance), and others.

OPERATING SYSTEM: An operating system includes system code and data structures which run application programs such as word processors and spreadsheets, which manage resources (e.g., disk storage, random access memory) for those programs, and which provide I/O facilities for users and programs (e.g., keyboard, mouse, display screen). Examples include DOS (e.g., MS-DOS), UNIX variations (e.g., Linux), Microsoft Windows variations (e.g., Windows 98, Windows NT), and others. The operating system often either includes or cooperates closely with a FILE SYSTEM. Much or all of the operating system code and data is often stored in FILES, but at least part of the BOOT CODE that loads and starts the operating system typically is not stored in a file. Some tasks are easier to perform on a computer before the operating system is booted, such as tasks that would compete with the operating system for control of resources (e.g., hard disks), while other tasks are easier to perform after the operating system is running, such as file reads and writes.

PARTITION: A partition is a collection of contiguous SECTORS on a hard disk. A partition may be unformatted, or it may be formatted for a particular FILE SYSTEM. Definitions of partitions are given in a partition table, which is generally not stored in a FILE but is instead stored in a particular SECTOR, such as the first sector of a disk.

SECTOR: A disk sector holds a specified amount of data; commonly used disk sectors hold 512 bytes of data each. Low-level routines, such as BIOS routines on an IBM-compatible PC, can be used to read and write individual disk sectors. However, application programs such as word processors and spreadsheets do not typically do such I/O themselves. Instead, they access data by way of FILES, and rely on the FILE SYSTEM software to locate the sectors in question and to read and/or write them as needed. A given disk sector in a PARTITION is not necessarily tracked by a file system, and a given sector on disk is not necessarily part of any partition. Hard disks are not the only storage devices which use sectors; sectors are also present on floppy disks and on CD-ROMs, for instance.

Bearing in mind these definitions and the availability of other information, such as references filed with the Patent Office pursuant to the duty of candor, the present invention will now be described and claimed.

BRIEF SUMMARY OF THE INVENTION

The present invention provides tools and techniques for running pre-boot code other than an operating system that is already installed on a computer system. For instance, the pre-boot code may boot from DOS on a normally DOS-less machine. The invention can also be used to boot from Linux, from an embedded operating system, and/or from another operating system without installing these operating systems in the conventional manner on the machine that is being booted. In some cases, the invention involves placing a floppy image on the machine's hard drive. The floppy image may contain a bootable file system which is conventionally found on a floppy disk. The floppy image is stored in a file in the file system normally used by the machine. The file resides in a user partition on the machine's hard drive. For booting DOS, the floppy image contains the same data one would find on a DOS-bootable floppy disk. In particular, the floppy image contains a Boot Record. Unlike a Master Boot Record (MBR) used on a hard disk, the floppy Boot Record does not contain a partition table. This provides improved flexibility. For example, a DOS floppy image could be stored in one or more files under an HPFS file system and used to boot DOS on a machine that normally boots only under the OS/2 operating system. Moreover, this can be done without creating a DOS partition on the machine and it can be done without using the machine's floppy disk drive; indeed, the machine need not have a floppy disk drive.

Because the floppy image is stored on the hard disk in a file under the file system of the hard disk partition, the floppy image is not necessarily contiguous on the hard disk. Also, because the floppy image is stored as such a file, it is readily accessible to users, regardless of whether the user in question is a factory technician, an end-user, or a company system administrator responsible for assisting company end-users.

During the boot process, a contiguous copy of the floppy image is created in the machine's random access memory (RAM), namely, in extended memory. The machine is booted from that contiguous RAM copy of the floppy image.

In one alternate design, the floppy image is not necessarily contiguous in memory. In another alternate design, the floppy image sectors are read and written directly from/to disk as needed, rather than creating a complete copy of the floppy image in memory. In another alternate design, the floppy image is cached, so part of the image is in memory and part is on disk. The advantage of either accessing the image directly from disk or using the caching method is that it does not require the use of extended memory (as described later). In all these designs (floppy image in extended memory or not, floppy image contiguous or not), floppy disk I/O is redirected to read and write from the floppy image, wherever it may be, rather than the floppy disk drive. This is accomplished by hooking (intercepting and conditionally redirecting) BIOS read/write interrupt int13H routines, watching for floppy I/O calls, and redirecting them to the floppy image.

More generally, this invention provides tools and techniques for intercepting the boot process to load code and/or data from one or more files in a file system normally used by the machine. This code is run before booting the operating system and it can be used to perform operations that cannot be readily performed while running the operating system. For instance, it can be used to install new or modified BIOS instructions in a flash memory, to run code that monitors the boot process of the conventionally installed operating system and creates a debugging log to help debug that process, and/or to manipulate disk partitions or their contents without violating data location assumptions made by a running operating system. Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing methods, devices, signals, programs, products, and systems according to the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file.

In particular, an "embodiment" of the invention may be a system, an article of manufacture, a method, and/or a signal which configures a computer memory or other digital or analog medium, including without limitation media used in peripheral storage devices. A "peripheral storage device" is a storage device such as a floppy disk drive, a CD-ROM or DVD-type drive, a hard drive, a removable disk drive (e.g., an Iomega Zip drive), a tape drive, or the like.

Methods and Systems Generally

Figure 1:
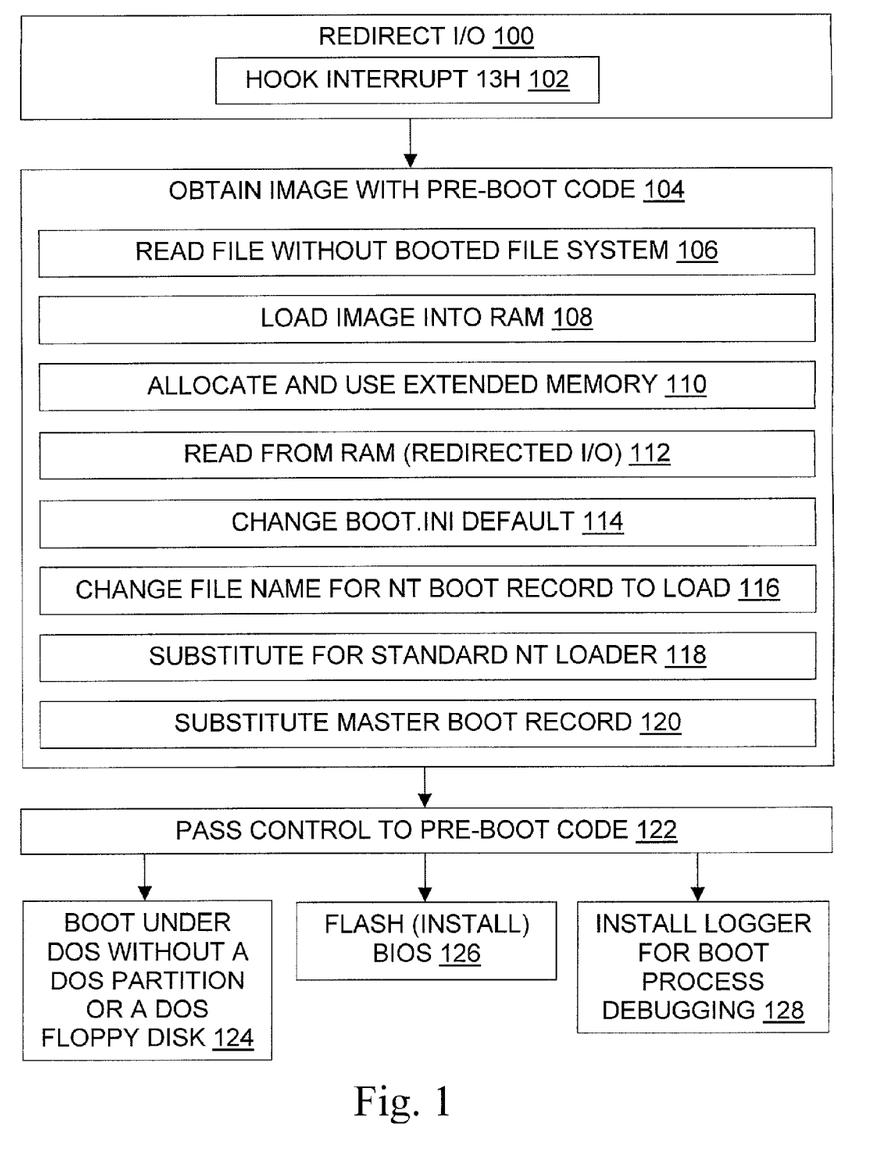
FIG. 1 shows a flowchart illustrating methods of the present invention, and this Figure accordingly also illustrates media which are configured with code to perform one or more such methods.
Figure 2:
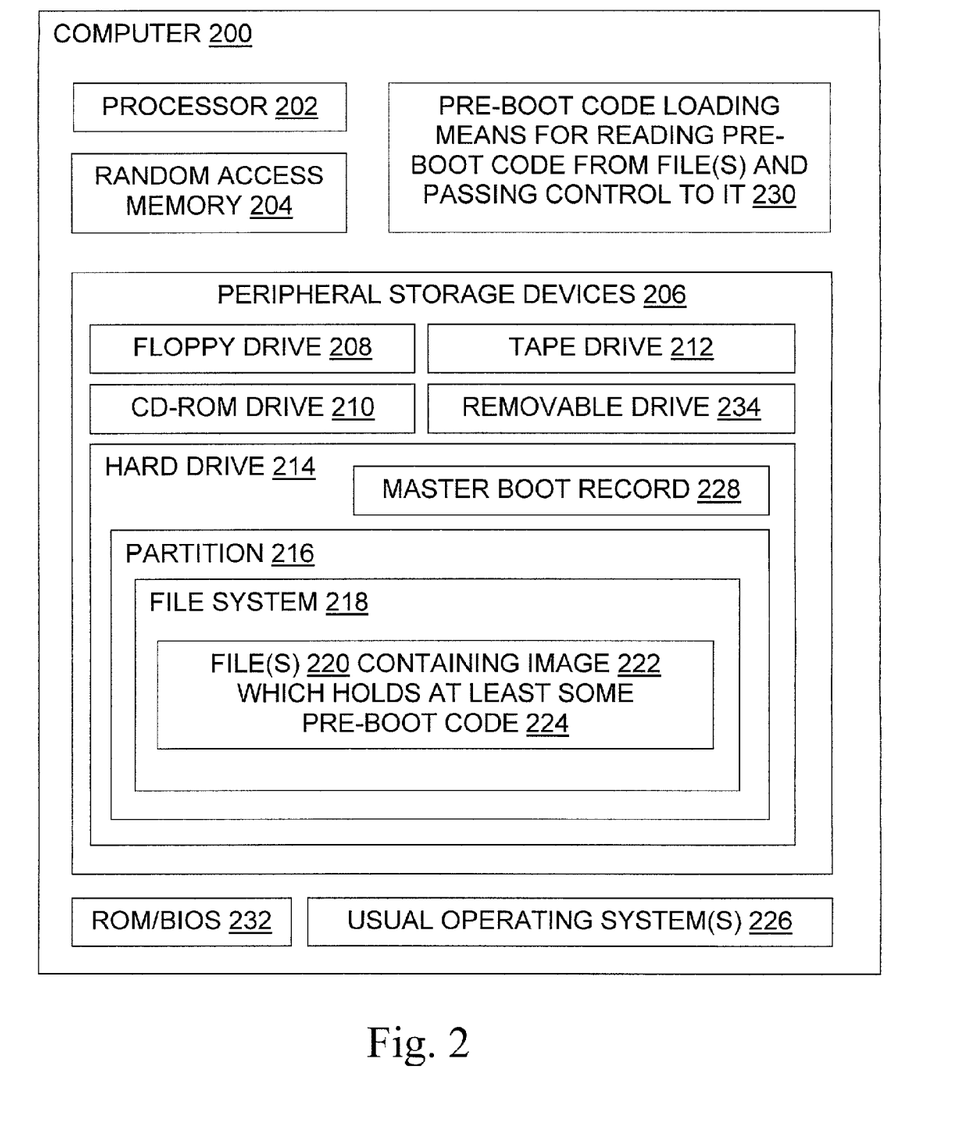
FIG. 2 shows a diagram illustrating systems of the present invention.

FIG. 1 illustrates methods of the present invention. These methods will first be described generally, and then in greater detail. Reference is also made to FIG. 2, which illustrates systems of the present invention. Some methods of the invention omit one or more illustrated steps; some methods repeat steps, group steps differently, and/or perform them in a different order than that shown. Likewise, some systems according to the invention omit or repeat illustrated components. Acceptable variations will be apparent to those of skill in the art in view of the teachings herein and the claims.

During a redirecting I/O step 100, I/O operations for a peripheral storage device 206 such as a floppy drive 208 of a computer 200 are redirected to an alternate source, such as random access memory (RAM) 204 of the same computer. I/O redirection may also or alternately be performed for other devices, such as a CD-ROM drive 210, tape drive 212, or removable (e.g., Iomega Zip) drive 234, but this will be most useful when the system tries to boot such another device before trying to boot from the hard drive 214. After redirection, a subsequent call to read a sector of data from the peripheral storage device returns data from the alternate source instead of returning data from the peripheral storage device. Familiar redirection techniques, such as hooking 102 an interrupt, may be used, as may familiar tools such as interrupt vectors and device drivers generally.

Redirection facilitates emulation of a physical peripheral storage device, such as a floppy disk drive. In some embodiments, a driver implementing the I/O redirection intercepts int 13h calls and handles all calls to the device being emulated, including not only read/write calls but also calls that return configuration and discovery information, such as a call to determine the number of floppy drives on the machine. Some of this information is also stored in RAM that is accessible to applications and the operating system. For instance, in one embodiment the inventive code updates a BIOS data area variable that indicates the number of floppy drives, incrementing it by one unless it is already at the maximum value, in which case it is not incremented and the fourth floppy drive becomes unavailable while the virtual floppy of the invention is in operation. Current drive A: is made by emulation to appear as drive B:, and drive B: appears as the last drive after all the hard drives. The "fake floppy" or virtual floppy of the invention then appears as drive A: through the driver, so it will provide the code that is booted.

During an image obtaining step 104, a processor 202 of the computer 200 obtains access to an image 222 from a file 220 on the computer. In many embodiments, a first step within the obtaining step 104 includes retrieving the image 222 from the file(s) 220 by reading it into RAM, and a second step within the obtaining step 104 includes reading the image from RAM using redirected I/O which emulates a floppy read operation. Each file 220 is in a file system 218, in the sense that file system structures specify the sectors allocated to the file 220. The file system 218 is in turn stored on disk 214 in at least one partition 216 which is defined in conventional manner by a partition table. For clarity of illustration, only one partition 216 is shown, but the disk(s) 214 may contain more than one partition 216. Different partitions 214 may be formatted for different file systems 218.

The image contains pre-boot code 224 that is intended to be run on the computer before running the operating system 226 that is conventionally installed on the computer, or pre-boot code 224 that is intended to be run instead of booting the operating system 226, if such an operating system exists (the invention may be used on computers 200 which do not yet have an operating system installed). In some cases, the image 222 is obtained by the processor 202 at least in part by using redirected I/O that was set up during step 100.

Some examples of pre-boot code include: (a) an operating system that is not conventionally installed on the machine but instead resides in one or more user files to be loaded as described herein; (b) code which prepares for and/or monitors conventionally installed operating system code when it runs later (e.g., pre-boot code may provide a process that logs operating system activity to assist in debugging the operating system); and (c) code that "boots" the machine by placing its hardware under software control, generally with some type of I/O, but not necessarily with the ability—found in operating systems—to execute other processes. Different terminology may be used. For instance, one can define "bootstrap code" as code needed to load an operating system, and "boot-mode code" as code that is run without an operating system. Code loaded from a Master Boot Record would then be boot-mode code, and the Windows NT boot record would be bootstrap boot-mode code. These distinctions illustrate the variety of situations in which the invention can be used.

The image 222 may be generated and stored in the image file in various ways. For instance, a floppy disk containing desired pre-boot code can be generated in conventional manner, as when one creates a bootable floppy disk. Then the content of that floppy disk can be copied, sector by sector, into an image file on hard disk so that the image file contains the same data as the floppy disk, in the same relative positions. Alternately, a special-purpose program can be written to output the bootable floppy's data in sectors in the same format as the data would take on the bootable floppy disk under the FAT 12 or FAT 16 file system, for instance. The data output by the special-purpose program is stored in the same order, with the same sector boundaries, in the image file 220.

The image obtaining step 104 may be embodied in one or more other steps. For instance, it may involve reading 106 the image 222 from the file(s) 220 without using booted file system 218 code by reading file system structures (e.g., file allocation table, directories, master file table) directly to locate the sectors that are allocated to the file(s) 220. The image 222 may then be read directly from disk 214 by the processor for execution, or the image may be copied 108 first into RAM 204. In RAM, the image may be loaded 108 in a contiguous piece, or it may be in several non-contiguous sections of RAM. If the image 222 is copied into RAM that might be overwritten before the image is executed, then it may be moved into another location for safety, such as a section of extended memory that is allocated 110 by calls from inventive code. The image 222 is then read 112 by the processor 202 for execution using the redirected I/O to read from RAM 204 instead of reading from the physical floppy or other device whose I/O was redirected. Note that "redirecting I/O" does not necessarily require the presence of the redirected peripheral storage device in the system; a device which is not present may also be emulated and the I/O for such a device may thus be redirected as discussed herein even when I/O operations for the device would otherwise fail because the device itself is not physically present.

The image 222 may also be read by the processor for execution as a result of code or user actions 230 that change 114 a setting (e.g., a file name) in a boot.ini file. This step 114 is somewhat reminiscent of I/O redirection, but it does not involve changing the result of reads from a peripheral storage device 206, so it is shown instead as part of the image obtaining step 104. Likewise, the image 222 may be read by the processor for execution as a result of changing 116 a file name 230 that is referenced by a loader 230, such as a Windows NT boot loader, to identify a boot record to load. The image 222 may also be read by the processor for execution by substituting 118 a pre-boot code loader 230 for the standard Windows NT loader NTLDR. The image obtaining step 104 may also temporarily replace 120 a master boot record 228 of the computer 200 with a boot record 230 that loads the image 222.

At some point, control passes 122 to pre-boot code. This may be pre-boot code in the form of an I/O redirecting 100 Fake Floppy device driver, pre-boot code in the form of a substituted 120 master boot record, pre-boot code in the form of a substituted 118 loader, and/or pre-boot code 224 stored in the file(s) 220. In combination with the teachings herein for configuring the computer's image file content, boot.ini file content, master boot record content, loader, and/or device drivers, conventional jump instructions may be used to give the processor 202 the first pre-boot code instruction to execute, which leads in turn to the next instruction, and so forth.

As a result of various steps in the illustrated steps 100 through 122, the invention permits useful results such as booting 124 the computer 200 under a DOS operating system even when the computer does not have a DOS partition or a bootable DOS floppy in the floppy drive 208. Instead or in addition, the invention permits installing 126 in a flash memory of the computer 200 new or modified BIOS 232 content. Instead or in addition, the invention also permits installing 128 a log process which logs the progress of a conventional boot process. Of course, steps 124 to 128 are not the only examples of useful pre-boot code operations. The invention also permits other useful pre-boot code operations, such as partition manipulation steps, which are best or only performed before an operating system is booted, or pre-boot code operations which require the use of an operating system that is not conventionally installed on the computer 200.

Additional Details

When extended memory is used 110 to store the floppy disk image 222, then under DOS, extended memory is allocated after boot-up by a memory manager such as one called HIMEM.SYS, which is not running when the floppy image is read 108 into extended memory. Accordingly, the image could be inadvertently overwritten unless steps are taken to protect it. In one case, this protection is provided as follows. Control passes to the boot code, which eventually loads HIMEM.SYS (or another memory manager; HIMEM. SYS is used here as an example). After the HIMEM.SYS code is loaded, and before any other calls are made to it that could overwrite the floppy image, the inventive code 230 calls HIMEM.SYS to allocate a new region of extended memory, and copies the floppy image into that new region. To determine when HIMEM.SYS has been loaded the inventive code 230 intercepts disk read/write calls by replacing the interrupt vector for interrupt 13H with a pointer to the inventive device driver code which operates as described below.

In particular, the sequence of events involving HIMEM. SYS detection proceeds generally as follows. The floppy image 222 is loaded 108 into RAM 204. Inventive device driver code 230 for redirecting 100 floppy I/O to the image, and for detecting HIMEM.SYS, is hooked 102 into interrupt int 13H. The floppy boot record from the image is loaded and run 122, which loads DOS boot code from the floppy disk image and passes it control. The DOS boot code eventually opens the config.sys file, reads it, and begins processing its contents. Those contents include a statement such as "device=HIMEM.SYS". Accordingly, the DOS boot code opens the HIMEM.SYS file, reads it, and loads HIMEM.SYS for execution. While this is happening, the hooked device driver for int 13H watches for file access operations. After HIMEM.SYS is loaded and before another program (a program is any executable code whether a driver or user program or other form of executable code) can allocate memory from HIMEM.SYS, that program must be loaded from a disk which requires an INT 13H function call; it is at this time that the inventive code 230 can allocate 110 extended memory while ensuring that no other program has had the opportunity to allocate memory before it. The inventive device driver int 13H code does not have access to the filename to determine that a file named "HIMEM.SYS" is being loaded. Instead, the device driver calls interrupt 2FH function 4300H to determine whether HIMEM.SYS has been loaded. The value 4300H is placed in register AX, and int 2FH is issued. If HIMEM.SYS is loaded, 80H should be returned in register AL. As soon as the device driver determines that HIMEM.SYS has been loaded, it uses HIMEM.SYS to allocate memory for the floppy image and copies the floppy image into the allocated memory. The config.sys file loads HIMEM.SYS with the /TESTMEM: OFF parameter to prevent HIMEM.SYS from testing extended memory, because that test would overwrite the floppy image 222. For instance, a config.sys file may contain "DEVICE=HIMEM.SYS /TESTMEM:OFF" as the first line. This method or a similar method can be used with any memory manager and does not require HIMEM.SYS specifically.

In one embodiment, no changes are made to the contents of the hard disk MBR 228 partition table entries in order to boot from the floppy image 222. However, the original MBR 228 boot code is temporarily relocated so that inventive MBR boot code 230 can be placed 120 in the original location long enough to boot from the floppy image 222. The original MBR and the inventive MBR contain different boot code, but each of these MBRs defines the same set of partition 216 starting and ending addresses for the hard disk 214 partitions.

In some cases, the floppy image 222 could be stored on a CD-ROM, a tape, or another medium instead of being stored on the hard drive 214. The floppy image on the CD, tape, or other medium is not necessarily contiguous. In some cases, only one floppy image is stored on a given CD, tape, or other medium. In other cases, it is desirable to store one floppy image per operating system and/or one floppy image per product on the CD, tape, or other medium. Regardless of the number of floppy images, the inventive technology would not require different floppy images on a CD, tape, or other medium corresponding to different types of floppy drives 208 on different machines 200. For example, the inventive technology need not try to determine whether a given machine is using a 1.44 MB floppy drive as opposed to a 1.2 MB floppy drive.

To prevent the Fake Floppy from loading on the next reboot, the MBR must be restored to its prior state. The prior MBR 228 is stored in the Fake Floppy driver file. After the Fake Floppy driver is loaded 108 into memory, the driver 230 can restore the MBR to its prior state. This may be done immediately to reduce the time during which the computer 200 cannot be booted to the normal OS 226, or it could be done later if the Fake Floppy needs to be booted multiple times. A flag in the driver file 230 could be used to determine if the MBR should be restored immediately or later. In one embodiment, the driver provides an API 230 to restore the MBR. This API could be called when the MBR should be restored or it could be called in a separate program run by the user. The API uses an int 13h function call with D700h in AX and 5150h in BX, which is otherwise normally unused.

An alternate method of restoring the MBR is to use a program 230 which we call RESTRMBR.EXE. Of course, the file names and specific content may vary between embodiments of the invention, provided that the embodiment operates as claimed. In this embodiment, RESTRMBR.EXE code 230 reads in the current MBR (in order to get the current partition table) then replaces the first 440 bytes (the boot code) with the first 440 bytes from the backed up MBR (MBR.DAT). The first 440 bytes is the available code space, which is located in front of the NT disk signature which uses 6 bytes; the NT disk signature is followed by the partition table which uses 64 bytes (16 bytes per entry), and the 2 byte signature (55AAh) (this fills the 512 byte sector). RESTRMBR.EXE then writes the newly modified MBR back out to disk. If RESTRMBR.EXE does not find the backed up MBR (MBR.DAT) it will write out the generic MBR code that is embedded within RESTRMBR.EXE.

An alternate method of disabling Fake Floppy 230 is to call the DOS FDISK.EXE program with a /MBR switch. FDISK will replace the current MBR 228 with the standard DOS generic MBR 228. This method will not preserve the NT disk signature.

A PQ Fake Floppy 230 embodiment of the invention simulates a floppy disk using a driver that is loaded by the MBR out of the file system 218 of one of the partitions 216 on one of the disks 214. This allows the machine 200 to be booted into DOS without using a boot floppy disk or booting off of a DOS partition on the hard disk. Fake Floppy can be used to boot a network client system 200 into DOS remotely without physically being at the client machine 200 so long as (a) the installation program 230 (PQFFINST.EXE), floppy loader files, and floppy image 222 are on the client machine, and (b) the installation program can be run remotely.

In this embodiment, a binary floppy disk image 222 must be in a file 220 named PQFF.IMG. PQFFINST.EXE, PQFF.IMG, FKFLOPPY.SYS and FKFLPLDR.SYS are placed in the same directory on a FAT/FAT32 or NTFS partition (primary or logical) on a fixed disk 214. These are examples; the file name(s) and file content may vary between implementations, provided that the implementation operates as claimed. In this embodiment, the disk must be interrupt 13h accessible from the BIOS 232 without drivers (a pre-boot driver may also be provided through the int 13h accessible device to access a device not supported by the BIOS) and before DOS has booted. The user then runs PQFFINST.EXE which sets up the files, backs up the current MBR 228 to a 512 byte region within FKFLOPPY.SYS and writes the FKFLPLDR.SYS to the MBR on disk. The MBR will also be backed up in the file MBR.DAT. The user then reboots the system 200 and the system boots from the floppy image 222.

In more detail, to facilitate step 106 PQFFINST.EXE scans the file PQFF.IMG and creates a list of sectors occupied by the file 220. PQFFINST.EXE then embeds this sector list into a table in the file FKFLOPPY.SYS. PQF-FINST.EXE then scans the file FKFLOPPY.SYS and creates a list of sectors occupied by FKFLOPPY.SYS. PQFFINST.EXE then embeds this sector list into a table in the file FKFLPLDR.SYS. A sector list is a table listing each individual sector of the file 220 in sequential order. This could be changed to use a sector run list. A sector run list includes a list of couplets. Each couplet contains the starting sector for a contiguous section of the file 220 and the number of sectors in that section. Rather than lists, one could use arrays, trees, tables, or other data structures.

In connection with generating the run list, the system preferably makes sure that only one drive on the computer has the signature in the sector of the first entry in the sector table for FKFLOPPY.SYS. After locating the first sector of FKFLOPPY.SYS, the code checks that same sector number on all other drives to ensure only that drive contains the signature in that sector number. If more than one drive contains the same signature in the same sector number, it renames the current FKFLOPPY.SYS to another name, and copies it to FKFLOPPY.SYS again so that its location will change. Then it obtains the starting sector of the new location and performs the check again.

The first 512 bytes of the file FKFLPLDR.SYS contain MBR code and a sector list that points to the additional sectors of FKFLPLDR.SYS. The additional sectors are stored in the first track of the first hard drive 214 (generally this is the first 63 sectors of the hard drive). PQFFINST.EXE will search for empty sectors to write the additional sectors to in the first track. A sector is assumed to be empty if the entire sector is filled with the same byte value, or filled with a recognized test pattern, or if its content is identical to the content of the next sector. PQFFINST.EXE will create a checksum and the sector list from the additional sectors and write the checksum and sector list to the proper locations in the first sector of FKFLPLDR.SYS. PQFFINST.EXE inserts the correct Windows NT signature, partition table, and boot signature into appropriate locations in the first 512 bytes of FKFLPLDR.SYS. The first 512 bytes of FKFLPLDR.SYS are then written to the MBR 228. If drive overlay software (such as Micro House EZ Drive or OnTrack Disk Manager) is present, one may not be able to write to the MBR, or one may have to write the MBR boot code to an alternate location.

If any errors occur in PQFFINST.EXE, it will terminate without modifying the MBR 228 code. The MBR code is modified last so that no errors will leave the system 200 in a bad state. If any errors occur when loading 104 the Fake Floppy driver, the active partition should be booted with its usual operating system 226.

Upon rebooting 122, the MBR code 230 preferably loads the additional sectors from the first track and does a checksum on those sectors; if the checksum is correct it will jump to code in the first of those sectors, otherwise it will boot the active partition 216. The drive order for the BIOS may differ from the drive order of the operating system. Accordingly, the code in the additional sectors loops through each hard disk, loads the first sector in the table for FKFLOPPY.SYS, and looks for the invention's signature (e.g., "INITPQFF") in that sector. This drive is assumed to be the correct drive; while generating the run lists, the program preferably ensured that only one drive will have the signature in this sector. If it doesn't find the signature on any drives 214 the pre-boot code will boot the active partition. When the code finds the signature, it loads the rest of the sectors in the table and jumps to an offset in the code, which is the code 230 from FKFLOPPY.SYS. The code in FKFLOPPY.SYS contains a sector list for the file PQFF.IMG, which is the floppy disk image. The code loads 108, 110 this image into extended memory and installs 100 an interrupt 13h handler which simulates a floppy disk by copying sectors in and out of extended memory 204 for sector reads and writes to the floppy disk. This may be done as discussed above.

FKFLOPPY.SYS also installs an interrupt handler 230 that checks to determine if the interrupt 2Fh vector has been modified from its original value; an XMS handler will change int 2Fh to point to its code. If the vector has been changed, the interrupt handler checks for XMS support every time a sector is read off of the disk. The default interrupt 2f vector on some machines may not point to a valid handler. When XMS support is detected, the driver allocates 110 1.44 MB (or whatever amount is needed) of extended memory through the XMS handler and locks the allocated memory into place. It then copies 110 the floppy image into the allocated block of extended memory, if that block is in a different location than the image's current location. The reason to check for XMS support on each disk read is that a DOS driver or program must first be read from disk before the program or driver can be installed and allocate any XMS memory. The block of memory that will hold the floppy image should be allocated before any other programs or drivers can load so that the floppy image 222 is not corrupted by any programs or drivers which use extended or expanded memory, such as EMM386.EXE.

HIMEM.SYS or any other memory manager MUST be loaded before any other programs or drivers in the CONFIG.SYS file of the floppy image if any programs that use XMS will be run. If HIMEM.SYS is not the first device driver loaded from the floppy image, any program that modifies extended memory may overwrite the floppy image or may become corrupt itself.

In this embodiment, PQFFINST.EXE, FKFLOPPY.SYS, FKFLPLDR.SYS and PQFF.IMG must all be installed to the same file system 218 directory on a FAT/FAT32 or NTFS partition 216. This is not required in other embodiments.

In an alternative embodiment, sector lists in FKFLPLDR.SYS and FKFLOPPY.SYS use sector run lists. In the best case (when all sectors of the file are contiguous) this will reduce the sector list size and improve performance. In worst case (when no sectors in the file are contiguous), it will increase the size of the sector list and decrease performance. Since the load time is minimal and size of the sector list is relatively small, this embodiment may not be preferred.

When implementing the Fake Floppy driver 230 it is important to make sure all interrupt 13h functions used for floppy disk access are understood and implemented correctly. When implementing the loader code 230 (which loads the Fake Floppy driver into memory) it is ideal to fit the necessary code in the first 440 bytes of the MBR leaving room for the NT disk signature and partition table entries. If this cannot be done, additional sectors in the first track can be used as described in this document.

The user interface of PQFFINST.EXE, if needed, is simplest if it is text based. It displays the current operation of the program, either "Scanning disks . . . " or "Setting up system for Fake Floppy boot . . . " and any runtime errors. A graphical user interface could be used if desired. PQFFINST.EXE can also return an ERRORLEVEL on exit in place of or in addition to a user interface.

One should test PQFFINST.EXE against different file systems' constraints, and on different FAT/FAT32 and NTFS partitions. Tests need to include fragmentation and reverse order allocation chain tests, different cluster sizes and partition sizes. In one embodiment, the supported file systems 218 are at least FAT/FAT32 and NTFS. As to DOS, because Fake Floppy 230 deals both with disk and memory access, it must be tested against disk and memory accesses. The interrupt 13h driver for Fake Floppy hooks 102 all interrupt 13h services. Therefore extensive hard disk and floppy disk access tests must be performed. Suggestions for tests including running a partition manipulation program such as PQMAGIC.EXE (from PowerQuest's PartitionMagic® product), an imaging program such as PQDI.EXE (from PowerQuest's Drive Image® product), and a system structure integrity verification tool such as SCANDISK.EXE. One should allocate an extended memory block to protect the floppy image in extended memory. One should test Fake Floppy against any programs that use extended memory, such as PQMAGIC.EXE, PQDI.EXE, MEM.EXE, EMM386.EXE. It would also be good to test Fake Floppy against different network drivers and with different network connections.

A good test would run either PQMAGIC.EXE or PQDI.EXE from the Fake Floppy disk with debug output redirected to a file on the Fake Floppy drive with EMM386.EXE loaded. One could perform extensive disk operations that require large amounts of memory with PowerQuest's PartitionMagic or Drive Image products.

One could also write a program that will compare the floppy image 222 in memory against a file 220, to check the integrity of the floppy image in memory. One could also add the ability to write protect the Fake Floppy drive.

If the process 100, 104 of loading the Fake Floppy driver fails, the loader should fail gracefully at boot up. If the Fake Floppy driver fails after it has been loaded, the driver will most definitely not fail gracefully. If extended memory is used and the extended memory driver (for example, HIMEM.SYS) is not the first device driver loaded from the floppy image, any program that modifies extended memory may overwrite the floppy image or may become corrupt itself.

None of the sector lists need to be a fixed length. The driver 230 may be hard coded for a 1.44 MB floppy image or it may be designed to use any floppy image 222. The floppy image 222 may be required by a particular BIOS to be of a standard size, but the use of a standard size (e.g., 1.44 MB) is not otherwise required. If the floppy size is insufficient for one's needs one can create a RAM drive after booting from the floppy and copy files to that RAM drive.

Although it is expected that the invention will be used most often to emulate a floppy drive, the invention can also emulate other storage devices, including without limitation an Iomega Zip drive, a CD-ROM or DVD drive, or a hard disk. Accordingly, the convenient term "floppy image" is not limited to images provided through redirection of floppy I/O but may also refer, in a particular embodiment, to images provided through redirection of other storage device I/O.

Microsoft Windows NT

The NT boot process can be intercepted and used to load the Fake Floppy code 224 or to load other pre-boot code 224 to perform other operations, such as flashing 126 the computer's BIOS or logging 128 the process for boot failure detection, or performing other operations that cannot be readily performed when running Windows NT, Windows 2000 or similar operating systems. This discussion explains in particular how to load a Fake Floppy driver and floppy disk image. However those skilled in the art will also be able to use the described techniques to load other types of pre-boot programs and data 224. All references to NT or Windows NT also refer to Windows 2000 or other operating systems that use an NT loader such as NTLDR to boot.

Normally the NT boot record is used to load NTLDR during the NT boot process. By changing 116 the filename in the boot record the boot record code can be used to read the floppy disk image from files 220 in the root directory. There are various methods to intervene in the NT boot process to load a pre-boot program and data 224. These are described below, using the Fake Floppy driver and floppy disk image as an example.

1. The file 230 PQBR.DAT is stored in the root directory of the NT boot partition. The following entry is stored 114 in the file BOOT.INI: "default=C:\PQBR.DAT". This entry is then set to be the default item in BOOT.INI. When the partition is to be booted, the NT boot record loads NTLDR from disk. NTLDR then reads BOOT.INI, which contains the list of available boot options. The BOOT.INI default option is set to load PQBR.DAT. NTLDR thinks that PQBR.DAT is a boot record for another operating system on the NT boot partition. NTLDR loads PQBR.DAT into memory at 0000h:7C00h and executes 122 it.

PQBR.DAT 230 uses the NT boot record code to load the floppy image 222 and driver from files 220 in the root directory. The active partition 216 on the first disk 214 will typically be the NT boot partition. The code checks the active primary partition on the first disk; if it is FAT/FAT32 or NTFS then it is the NT boot partition; if the active partition is an IBM Boot Manager (mark of IBM) partition, then the only visible FAT/FAT32 or NTFS primary on the first disk should be the NT boot partition. Similar checks may need to be performed in other situations. The boot record 228 from this partition is read into memory 204. Next, the file name in the boot record is changed 118 in memory from NTLDR to the name of the desired file. Last, the boot record is executed. In FAT16 and FAT32 partitions the file name NTLDR is in the first sector of the boot record; it can be changed after loading the first sector of the boot record and before executing it.

On NTFS partitions the file name NTLDR is not stored in the first sector of the boot record and is stored in UNICODE format. The name should not be changed on disk, so that future booting from the partition will not be affected. The file name NTLDR must be changed after the boot record has loaded the sector containing the file name and before it executes code that uses this name. This can be done using an interrupt 13h handler 230. This handler checks each sector read for the file name NTLDR. When this name is found, it is replaced with the name of the desired file 230. Control is then returned to the NT boot record, which loads the desired file. It is important to uninstall the interrupt 13h handler after the name has been replaced and before returning control to the NT boot record, so that no other instances of this name are replaced. For example the interrupt handler should not change the name of the NTLDR file as the root directory is read from disk.

The boot record loads the desired file into memory at 2000h:0000h and begins executing 122 it. It is important that the code at the beginning of the file 220 continues the boot process. On NTFS and FAT32 partitions, the NT boot record will load up to 500 KB of the file. On FAT16 only the first sector of the file will be loaded. If the entire file is loaded (NTFS and FAT32), the boot record will execute the code starting at the beginning of the file (2000h:0000h). If the only the first sector has been loaded (FAT 16), the boot record will begin executing the file at an offset of three bytes into the file (2000h:0003h). This means that the first instruction in the file should be a three byte near jump instruction that will jump over the code needed to load the rest of the file from a FAT 16 partition.

In this embodiment of the invention, the root directory will contain files 220 named PQLD? (where ? is a digit between 0 and 9). These files will contain the floppy disk image 222 and Fake Floppy driver code 230. As explained earlier, only the first 500 KB of a file will be loaded into memory using the NT boot record. The floppy disk image and Fake Floppy driver require more than 500 KB and must, therefore, be stored in multiple files 220. We store 480 KB (exactly one third of a 1.44 MB floppy image) in each of three files. These files are named PQLD0, PQLD1 and PQLD2. The last file (PQLD2) also contains the Fake Floppy driver. PQLD0 contains the code necessary to move 110 its portion of the floppy image 222 into extended memory. PQLD0 also contains the code necessary to load PQLD1 into memory and execute it. This section of the code is the same as the code in PQBR.DAT and uses the same process to use the NT boot record to load PQLD1 (instead of PQLD0). After PQLD1 is loaded and executed, it moves 110 its portion of the floppy disk image 222 into extended memory and then uses the same process to load PQLD2 and execute it. The last file in the sequence, which in this example is PQLD2, moves 110 its portion of the floppy disk image 222 into extended memory. PQLD2 then installs the Fake Floppy driver and boots the floppy disk image.

To prevent the Fake Floppy from loading on the next reboot, the BOOT.INI must be restored to its prior state. In this embodiment, the BOOT.INI file is restored after the floppy disk image has been booted. It can be done as part of AUTOEXEC.BAT or other automatic processing, or by the operator running a program to restore BOOT.INI. If the file system 218 is not accessible to DOS (such as when NTFS and/or a hidden partition are used) then the code used to restore the BOOT.INI file must be able to access the file without using native DOS file access. This is the biggest disadvantage to this method. The other main disadvantage is that this method apparently only works on Windows NT systems.

2. Another method is to use the BOOT.INI entry to load a file up to 64 KB in size. The file 220 that is loaded (in our example PQBR.DAT) can be up to 64 KB in size. This method works well when the program and associated data which needs to be loaded is small. It can be used repeatedly to load 64 KB pieces, one after the other. This can be done by changing 114 the BOOT.INI entry or renaming the files 220 on disk.

Windows NT and other Operating Systems

The next two methods of intercepting the boot process can be used for Windows NT, Windows 2000, and most other operating systems.

1. Change 116 the name of the file that the boot record will load. This is a variation on method 1 under the previous section, however it is not limited to Windows NT and can be used with a variety of operating systems. This variation is to change the boot record 228 on disk to load PQLD0 230 instead of NTLDR, IO.SYS or other boot file loaded by the boot record. The rest of the process remains the same as method 1 above, except (a) the code must replace PQLD0 with the next file in the sequence, (b) the code must replace PQLD0 in the boot record with NTLDR, IO.SYS, or previous boot file name when the process is completed, and (c) BOOT.INI does not need to be changed or restored. The advantage to this approach is (a) it can work with operating systems in addition to Windows NT and (b) that one doesn't need code that can restore BOOT.INI back to its prior state. This is especially helpful when the file system 218 cannot be accessed natively from DOS. The biggest disadvantage to this method is that it requires direct disk 214 access to the boot record 228 for initial setup. This needs administrative rights to modify the boot record 228 under Windows NT and may require administrative access in other operating systems 226.

Another variation on this method is to always change 116 the file name in the boot record 228 on the disk for each file 220 that is to be loaded, instead of changing the file name in memory or using the interrupt 13h hook to find and change the file name. The advantage of this method is that it eliminates the int 13 hook.

2. Replace 118 the file NTLDR, IO.SYS, or other boot file. One could replace the NTLDR, IO.SYS, or other boot file with the PQLD? file that is currently in line to be loaded. This would require direct file I/O code to rename the files at each step. The code 230 to do this could be fairly large.

With respect to all methods discussed above, please note that the non-standard file names used (e.g., those beginning with "PQ" or "FK") are merely examples. Other embodiments may use different file names. Likewise, other embodiments may use different signatures to identify sectors and/or use different data structures to hold the sector addresses and other pertinent data. Also, the standard file names (HIMEM.SYS, AUTOEXEC.BAT, NTLDR, etc.), interrupt invocations (e.g., int 13h, int 2fh), memory addresses, offsets, signatures (e.g., NT signature), and/or size constraints noted herein may differ in other operating system releases, other operating systems, or other hardware/BIOS platforms. In particular, and without limiting the foregoing, the invention may also be implemented on systems having differently sized sectors, such as 1024-byte sectors. Statements about the relative advantages of the invention pertain to specific situations and do not limit the scope of the claims.

Editing the boot.ini File from Pre-Boot Code

The default entry in BOOT.INI can be changed during the boot process by the following steps. When setting up the files in the root directory and modifying the BOOT.INI, change the first character of the default entry in BOOT.INI to ';' so that it becomes a comment. For example, if the default entry is "default=mulit(0)disk(0)rdisk(0)partition(1)\WINNT",
change it to ";efault=mulit(0)disk(0)rdisk(0)partition(1)\WINNT". Then insert a default entry for the file containing the code to be loaded in place of NTLDR. The file will then contain the following entries:
;efault=mulit(0)disk(0)rdisk(0)partition(1)\WINNT
default=C:\PQBR.DAT It is necessary to make sure both of these entries are in the same sector of the file BOOT.INI. This can be done by adding comments before these entries or moving the contents of the file around.

After PQBR.DAT has been loaded during the boot process, install an interrupt 13h handler that monitors disk reads from the first hard disk. Read the NT boot partition's boot record into memory and alter the file name to be loaded from NTLDR to BOOT.INI using the aforementioned process. When a sector has been read containing the text "default=C:\PQBR.DAT", you know that this sector is the sector that needs to be modified in BOOT.INI. Then change the lines containing the previous default entry to the following and write the sector back to the disk and continue loading PQLD0-PQLD2 as discussed above:
default=mulit(0)disk(0)rdisk(0)partition(1)\WINNT
;efault=C:\PQBR.DAT Note that the length of BOOT.INI need not be changed nor the position of any characters to make this change. This removes any need of knowledge of the file system of the NT boot partition.

One would also add the line "C:\PQBR.DAT="PQFF"" to the"[operating systems]" section of the BOOT.INI file. It is preferred to use the BOOT.INI editing method from pre-boot code to comment out this line as well so the user could not manually select this option. It could also be done by code run from Windows NT on the next boot.

It is believed this approach will work on all file systems supported by Windows NT. On NTFS systems, BOOT.INI will need to be padded out with comments at the end so that none of its data will be stored in the file's FRS, but in clusters instead which begin and end on sector boundaries.

SUMMARY

The present invention provides methods for loading and running pre-boot code 224 on a computer 200 from a local file 220, comprising steps such as: redirecting I/O 100 of a peripheral storage device 206 such as a floppy drive 208 of the computer 200, whereby a subsequent call to read a sector of data from the peripheral storage device 206 returns data from an alternate source instead of returning data from the peripheral storage device 206; obtaining 104 an image 222 from a file 220 on the computer 200, the image 222 containing the pre-boot code 224, the image 222 obtained at least in part by using redirected I/O; and passing control 122 of the computer 200 to the pre-boot code 224.

In some embodiments, the obtaining step 104 obtains a boot image 222 and the passing control step 122 passes control to an operating system which then boots on the computer 200; the computer 200 boots from a different operating system 226 or does not boot (no installed OS) when the redirecting step 100 is not used. In one such embodiment, the boot image 222 includes DOS operating system code, and the passing control step 122 results in booting DOS on the computer 200.

In some embodiments, the obtaining step 104 obtains an image 222 containing pre-boot code which flashes 126 BIOS in a memory of the computer 200. In some, the obtaining step 104 obtains an image containing pre-boot code 224 which logs a subsequent boot process to assist determination of a cause of boot failure on the computer.

The redirecting I/O step 100 may redirect floppy I/O to read from a random access memory 204 of the computer 200 as the alternate source. In particular, one method comprises loading 110 a floppy image 222 into extended memory of the computer as the alternate source. Such a method may detect the presence of a memory manager and load the floppy image 222 into memory allocated by the memory manager before code other than the pre-boot code allocates memory using the memory manager.

In some embodiments, the obtaining step 104 comprises reading 106 pre-boot code from the file(s) 220 into a contiguous region of random access memory 204 in the computer 200, and the redirected I/O reads pre-boot code 224 from such a contiguous region as the alternate source. In some, the obtaining step 104 comprises reading pre-boot code 224 from the file(s) 220 into at least one region of random access memory in the computer, and the redirected I/O reads pre-boot code from the random access memory as the alternate source; this alternative does not require a contiguous image in memory 204. In some embodiments, the obtaining step 104 comprises reading 106 pre-boot code from the file directly for execution, sector by sector, using redirected I/O to read the file as the alternate source. The file sectors read need not be contiguous on the hard disk 214.

In some embodiments, the obtaining step comprises setting 114 a default item in a Windows boot.ini file or similar boot initialization file. Sometimes the obtaining step 104 comprises changing 116 the name of a file an NT boot record will load; sometimes it substitutes 116 other pre-boot code for standard loader code, such as for standard NT loader (e.g., NTLDR) code. In some embodiments, the obtaining step 104 comprises using the default boot.ini entry to identify non-standard pre-boot code to load.

The invention also provides a computer system 200 configured to run pre-boot code 224 from a local file 220. In some embodiments, the computer system 200 includes a processor 202 in operable connection with a random access memory 204, and a local hard drive 214 ("local" means accessible to the processor without a network connection). The local hard drive stores a partition 216 which contains a file system 218 containing file(s) 220 that hold pre-boot code 224. A pre-boot code loading means 230 includes code for reading the pre-boot code 224 from the file(s) 220 into the random access memory 204 (into a contiguous block, into non-contiguous pieces, into low memory and/or extended memory, all at once or sector by sector as needed) for execution by the processor 202 prior to, or in place of, booting on the computer 200 an operating system 226 which is distinct from the pre-boot code 224.

In some embodiments, the pre-boot code loading means 230 comprises code for redirecting floppy drive I/O, such as code 230 to read pre-boot code from the random access memory 204, and/or code to read 106 pre-boot code from the file(s) 220 without requiring a booted file system and a booted operating system. In some embodiments, the pre-boot code loading means identifies the pre-boot code file by using a default item in a boot.ini file. In some, the pre-boot code loading means changes the name of a file an NT boot record will load. In some, it substitutes pre-boot code for standard NT loader (NTLDR) code. The computer system 200 may be configured with pre-boot code loading means 230 which reads a sector data structure that identifies sectors of the file that contains the pre-boot code, and/or with a means 230 that calls an extended memory manager to allocate a new region of extended memory and then copies pre-boot code into that new region. In some cases, the pre-boot code loading means 230 caches pre-boot code, so part of the pre-boot code 224 is in memory 204 and part is on disk 214. The computer thus configured may run various pre-boot codes 224. In particular, one embodiment permits the system 200 to be booted into a DOS operating system without using a boot floppy disk and without booting off of a DOS hard disk partition.

The invention may also be embodied in a configured computer program storage medium (e.g., CD-ROM, hard disk, RAM) which contains software to perform method steps for running pre-boot code 224 from a local file 220. The method steps may be those discussed in the summary above, or other methods disclosed and taught herein. That is, steps recited in configured storage medium claims need not be limited to an exact correspondence with steps recited in method claims, although such correspondences are permitted.

As used herein, terms such as "a" and "the" and designations such as "file", "image", "file system", "partition" and "hard disk", are inclusive of one or more of the indicated element. In particular, in the claims a reference to an element generally means at least one such element is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for loading and running pre-boot code on a computer that is configured to attempt to boot from a bootable source other than a harddisk before attempting to boot from the harddisk, the method comprising:
   an act of retrieving pre-boot code from a file on the harddisk into random access memory by hooking device driver code into interrupt Int 13H during each boot attempt from the bootable source other than the harddisk, wherein the file is managed by a file system and the act of retrieving is performed without the file system first being operational on the computer;
   an act of issuing a plurality of I/O requests directed to a bootable source other than the harddisk;
   an act of redirecting at least some of the plurality of the I/O requests to the random access memory;
   an act of reading at least some of the pre-boot code from the random access memory using at least one of the redirected I/O requests; and
   an act of executing at least a portion of the pre-boot code read from the random access memory.

2. The method of claim 1, wherein the act of executing causes the computer to boot a first operating system that is different than a second operating system that would boot when booting from the harddisk.

3. The method of claim 2, wherein the first operating system is a DOS operating system.

4. The method of claim 1, wherein the bootable source other than the harddisk is a floppy drive.

5. The method of claim 1, wherein the bootable source is a CD-ROM drive.

6. The method of claim 1, wherein the bootable source is a tape drive.

7. A method for loading and running pre-boot code on a computer from a local file, comprising the steps of:
   retrieving an image from a file on the computer into RAM, the image containing the pre-boot code;
   at least initiating redirecting I/O to emulate a peripheral storage device of the computer, whereby a subsequent call to read a sector of data from the peripheral storage device returns data from an alternate source instead of returning data from the peripheral storage device, wherein the redirecting I/O step redirects floppy I/O to read from random access memory of the computer as the alternate source; and
   reading at least a first sector of pre-boot code from the emulated peripheral storage device, and executing it, thereby passing control of the computer to the pre-boot code first sector, wherein the reading step reads an image containing pre-boot code which flashes BIOS in a memory of the computer.

8. A method for loading and running pre-boot code on a computer from a local file, comprising the steps of:
   retrieving an image from a file on the computer into RAM, the image containing the pre-boot code;
   at least initiating redirecting I/O to emulate a peripheral storage device of the computer, whereby a subsequent call to read a sector of data from the peripheral storage device returns data from an alternate source instead of returning data from the peripheral storage device, wherein the redirecting I/O step redirects floppy I/O to read from random access memory of the computer as the alternate source; and reading at least a first sector of pre-boot code from the emulated peripheral storage device, and executing it, thereby passing control of the computer to the pre-boot code first sector, wherein the reading step reads an image containing pre-boot code which logs a subsequent boot process to detect boot failure and assist determination of a cause of boot failure on the computer.

9. A computer system configured to attempt to boot from a bootable source other than a harddisk before attempting to boot from the harddisk, the computer system comprising:
 a random access memory;
 a processor in operable connection with the random access memory;
 a local hard drive accessible to the processor without a network connection, the local hard drive containing pre-boot code; and
 a pre-boot code loading means for retrieving the pre-boot code from the local hard drive into the random access memory without the file system first being operational on the computer system by hooking device driver code into interrupt Int 13H during each boot attempt from the bootable source other than the harddisk; and
 a redirection means configured to receive I/O requests directed to a bootable source other than the local hard drive to the random access memory, wherein the processor executes the pre-boot code from the random access memory when attempting to boot from the bootable source.

10. The configured computer system of claim 9, wherein the pre-boot code loading means comprises code for redirecting bootable source I/O to read pre-boot code from a contiguous region in the random access memory.

11. The configured computer system of claim 9, wherein the pre-boot code loading means changes the name of a file an NT boot record will load.

12. The configured computer system of claim 9, wherein the pre-boot code loading means substitutes pre-boot code for standard NT loader code.

13. The configured computer system of claim 9, wherein the pre-boot code loading means caches pre-boot code, whereby part of the pre-boot code is in memory and part is on disk.

14. The configured computer system of claim 9, wherein the pre-boot code loading means permits the system to be booted into a DOS operating system without using a boot floppy disk and without booting off of a DOS hard disk partition.

15. A configured computer program storage medium which contains software to perform a method for running pre-boot code from a local file, the method comprising:
 an act of retrieving pre-boot code from a file on a harddisk into random access memory by hooking device driver code into interrupt Int 13H during each boot attempt from the bootable source other than the harddisk, wherein the file is managed by a file system and the act of retrieving is performed without the file system first being operational on the computer;
 upon receiving plurality of I/O requests directed to a bootable source other than the harddisk, an act of redirecting at least some of the plurality of the I/O requests to the random access memory; and
 an act of reading at least some of the pre-boot code from the random access memory using at least one of the redirected I/O requests to thereby access the pre-boot code from the random access memory instead of the bootable source.

16. The configured computer program storage medium of claim 15, the method further comprising an act of passing control to an operating system so that the operating system may execute the pre-boot code to thereby cause the operating system to boot on the computer.

17. The configured computer program storage medium of claim 16, wherein the pre-boot code includes DOS operating system code.

18. The configured computer program storage medium of claim 15, wherein the bootable source is a floppy.

* * * * *